US008712098B2

(12) United States Patent
Bodenmueller

(10) Patent No.: US 8,712,098 B2
(45) Date of Patent: Apr. 29, 2014

(54) METHOD AND SYSTEM FOR DETECTING TARGET OBJECTS

(75) Inventor: Albert Bodenmueller, Beimerstetten (DE)

(73) Assignee: Eads Deutschland GmbH, Ottobrunn (DE)

( * ) Notice: Subject to any disclaimer, the term of this patent is extended or adjusted under 35 U.S.C. 154(b) by 348 days.

(21) Appl. No.: 13/202,233

(22) PCT Filed: Jan. 27, 2010

(86) PCT No.: PCT/DE2010/000087
§ 371 (c)(1),
(2), (4) Date: Aug. 18, 2011

(87) PCT Pub. No.: WO2010/094253
PCT Pub. Date: Aug. 26, 2010

(65) Prior Publication Data
US 2011/0299734 A1    Dec. 8, 2011

(30) Foreign Application Priority Data
Feb. 20, 2009    (DE) .......................... 10 2009 009 896

(51) Int. Cl.
*G06K 9/00*    (2006.01)

(52) U.S. Cl.
USPC ........................................... 382/103; 342/52

(58) Field of Classification Search
CPC .......... G06K 9/00624; G06K 9/00993; G06K 2209/21; G06T 7/004; G06T 7/0051; G06T 7/20; G06T 7/2093; G06T 2207/10028; G06T 2207/10032; G01S 3/785; G01S 3/7864; G01S 13/867; G01S 17/023; G01S 17/06; G01S 17/66

USPC .................. 382/103; 348/169; 342/52, 55
See application file for complete search history.

(56) References Cited

U.S. PATENT DOCUMENTS

| 6,072,889 A | 6/2000 | Deaett et al. ................... 382/103 |
| 6,181,271 B1 * | 1/2001 | Hosaka et al. ................... 342/33 |
| 2003/0005030 A1 | 1/2003 | Sutton et al. ................... 709/200 |
| 2004/0183712 A1 * | 9/2004 | Levitan et al. ................... 342/22 |
| 2006/0049974 A1 | 3/2006 | Williams ......................... 342/52 |
| 2007/0146195 A1 | 6/2007 | Wallenberg et al. ............. 342/52 |
| 2010/0007476 A1 | 1/2010 | Klotz et al. ................. 340/425.5 |

FOREIGN PATENT DOCUMENTS

| DE | 10 2004 038 494 A1 | 3/2006 | ............... G01D 1/00 |
| WO | WO99/28759 A1 | 6/1999 | ............. G01S 3/786 |

* cited by examiner

*Primary Examiner* — Andrew W Johns
(74) *Attorney, Agent, or Firm* — Greenblum & Bernstein, P.L.C.

(57) ABSTRACT

Method for detecting target objects by a first sensor device containing at least one first sensor and a second sensor device containing at least one second sensor. The second sensor is alignable by a control device in different spatial directions. Method includes: detecting target objects by first sensor device, determining at least one first target parameter for target objects; and storing at least a part of target objects with at least one first target parameter and information on a spatial direction of target object relative to a position of second sensor. Method additionally includes: assessing stored target objects, and determining highest priority target object; aligning second sensor to highest priority target object, and obtaining a sensor signal of second sensor to target object; extracting at least one further target parameter by automatic evaluation of sensor signal; and performing assessing, aligning, and extracting repeatedly.

34 Claims, 2 Drawing Sheets

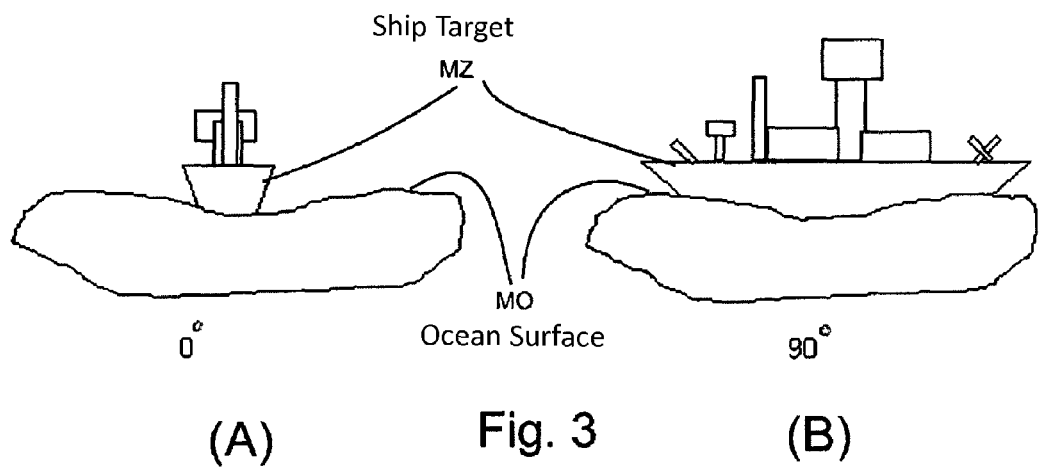
(A)　　　Fig. 3　　　(B)
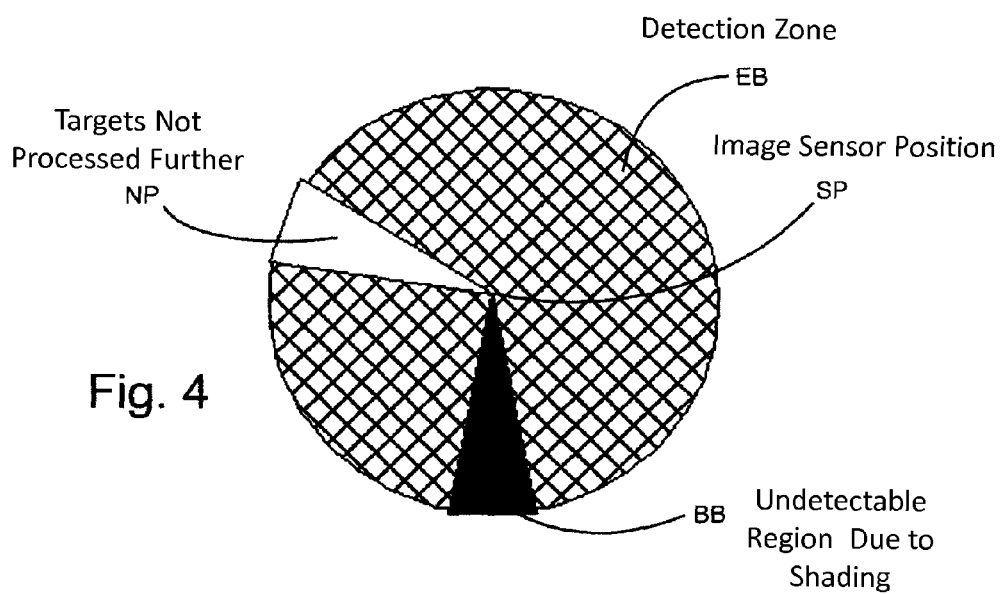
Fig. 4

METHOD AND SYSTEM FOR DETECTING TARGET OBJECTS

CROSS REFERENCE TO RELATED APPLICATIONS

The present application is a U.S. National Stage of International Application No. PCT/DE2010/000087 filed Jan. 27, 2010, which published as WO 2010/094253 A2 on Aug. 26, 2010, the disclosure of which is expressly incorporated by reference herein in its entirety. Further, this application claims priority under 35 U.S.C. §119 and §365 of German Application No. 10 2009 009 896.8 filed Feb. 20, 2009.

BACKGROUND OF THE INVENTION

1. Field of the Invention

The invention relates to a method and a system for detecting target objects using an imaging electro-optical image sensor.

2. Background Description

To detect target objects inside a monitoring area, combinations of different sensors are particularly advantageous, in that a first sensor device with at least one first sensor, for example, a radar system and/or a passive or active laser sensor, detects a target object and determines a first target parameter therefor, and further information is obtained by a second sensor device with at least one second sensor, wherein the second sensor is formed by a different sensor type than the first sensor. In particular, electro-optical imaging image sensors are becoming increasingly important as second sensors of this type due to the possibility, by evaluating an image obtained thereby, of classifying more narrowly target objects that cannot be distinguished with other sensors. Such electro-optical image sensors are designed in particular for the visible or the infrared spectral range.

Electro-optical image sensors of this type represent an important aid for identifying and classifying targets especially in the military field and in the case of sovereign functions such as, e.g., police monitoring and border security.

In systems with electro-optical sensors, methods are known in which these sensors in all-round search operation scan a predetermined search region in order to detect targets therein and to display/represent them to the operator in order then to automatically continue searching or, upon a command from an operator, to wait to continue the search. Electro-optical sensors have also hitherto been manually controlled by an operator, who aligns the electro-optical sensor manually to targets of interest based on the current situation display based on other available sensors and situation information from tactical data links.

It is also known to carry out an optimization of drones equipped with electro-optical sensors or the like unmanned aircraft such that an optimum flight path is calculated for the drone based on the tactical ground situation and the optimum flight path is selected from several possible flight paths in order to update the ground situation with the sensor data.

It is also known that with a stationary or in a manned flying platform (e.g., police helicopter) in which an electro-optical sensor is fixedly aligned or manually aligned by an operator, the current image information is fed to an automatic image evaluation and the targets detected therewith are classified and this information is displayed in the image information so that the operator is alerted to potential objects of interest or the detection ability of the operator is supported.

The informational content of an image recorded by an image sensor of this type is a priori high and the automatic image evaluation of an individual image is computer-intensive and time-consuming, so that with an all-round search operation by an optical image sensor typically only slow-changing scenarios can be usefully detected and optically evaluated.

It is therefore known that a situation display based on different sensors, e.g., active and/or passive radar and laser sensors, is displayed to a viewer and the viewer aligns an electro-optical image sensor to target objects discernible in this situation display, which is also referred to as assigning the image sensor to a target object. However, the evaluation of the displayed situation display and the selection of the target objects is highly subjective and, particularly in threat scenarios, cannot cope with a possibly quickly changing situation and a suitable reaction.

SUMMARY OF THE INVENTION

The aim of the present invention is therefore to disclose a method and a system for detecting target objects with a second sensor, in particular an electro-optical image sensor, which renders possible a better detection of even quickly-changing scenarios.

Solutions according to the invention are described in the independent claims. The dependent claims contain advantageous embodiments and further developments of the invention.

The invention combines a monitoring of a monitoring area by a first sensor device with at least one first sensor which is not an electro-optical image sensor and preferably carries out with respect to the second sensor a quick detection of target objects inside the monitoring area, with an automated evaluation of individual target objects detected thereby, with an automatic determination of a highest priority target object and with an automatic assignment of a second sensor of a second sensor device to the highest priority target object.

The determination of the highest priority target object among several currently detected target objects is carried out by the application of stored evaluation criteria to the at least one target parameter and/or other data available on the target object, which have been obtained and stored on the respective target objects by the at least one first sensor of the first sensor device. Different parameters can be available for different target objects. Different evaluation criteria can advantageously be directed at different parameters. Parameters can also contain the lack of detectable variables, for example, as zero value of a parameter describing a laser emission of a target object when the target does not show any such laser emission.

Advantageously, with the automated evaluation based on stored evaluation criteria on each or at least on several target objects respectively a prioritization value individually assigned thereto can be determined as a value on a one-dimensional scale. From the prioritization values a ranking can be compiled which is headed by the highest priority target object. The prioritization values are continuously updated so that the ranking can change dynamically. Typically, a target object detected by the second sensor as the highest priority target object will thereafter fall in the ranking, since an immediately new detection by the second sensor as a rule does not produce a major increase in information and therefore does not have a high priority. A target object newly detected by the first sensor device can skip over target objects already previously detected in the ranking, depending on the result of the application of the stored evaluation criteria. A target object detected by the second sensor can thereafter be more quickly subjected to a new detection than a target object with detection carried out earlier. The order of the assignment of the second sensor to the different target objects thus generally deviates from the order of the chronological detection by the first sensor device. Target objects can also be dropped from the automated evaluation if, e.g., a target object leaves the monitoring area or if a target object is classified as definitively no longer of interest.

The automated evaluation based on stored evaluation criteria and the assignment of the second sensor to a target object determined as the highest priority in the evaluation renders possible an acquisition of information optimized within the scope of the stored evaluation criteria for the totality of the target objects, wherein the contribution of an individual target object to the total information can depend on the ability of the second sensor to extract further target parameters in an assignment to a target, on the input of the assignment of the second sensor to the target object and the importance of the target within the overall situation in the monitoring area, which is predefined by the stored evaluation criteria and in particular can be advantageously realized by the cited prioritization values.

The first sensor device for detecting target objects as the at least one first sensor or several first sensors can contain sensors known per se, such as, e.g., active radar sensors or active laser sensors for the determination of a solid angle and the distance of a target object by emitting electromagnetic waves and receiving portions backscattered by target objects, which optionally can also carry out a first classification. First sensors can also be passive receivers of electromagnetic radiation, which pick up radiation emitted by a target object, in particular radar, radio or laser radiation, and carry out a direction determination or location determination.

Preferably, at least one first sensor of the first sensor device is arranged in a fixed spatial allocation to the second sensor. In particular, the second sensor can be arranged on a land vehicle, water craft, aircraft or spacecraft. A first sensor of the first sensor device can also be further distant from the second sensor of the second sensor device and can also be arranged outside the detection zone of the second sensor and also changeable in terms of distance and/or direction relative thereto and transmit the target parameter or target parameters of a detected target object via a data connection to the location of the evaluation device. A target object can thereby be located in an overlapping region of the monitoring area of the first sensor of the first sensor device and the monitoring area of the second sensor or also just reach the monitoring area of the second sensor. Unless explicitly stated otherwise, without loss of generality it is assumed below to simplify matters that in a preferred embodiment the at least one first sensor of the sensor device and the at least one second sensor of a second sensor device are arranged in fixed spatial allocation to one another and the monitoring angle ranges of the first sensor and the second sensor essentially coincide. The first sensor device can contain several first sensors, in particular, of a different functional type. The concept of the first sensor should distinguish it or them from the second sensor, in particular, with respect to the sensor type.

Without loss of generality, to simplify matters the at least one second sensor of the second sensor device is assumed below to be an imaging sensor, in particular an electro-optical image sensor, and the first sensor device is also referred to simply as the sensor device.

The sensor device determines in a known manner, depending on the functional type of the first sensor, the direction of a detected target object relative to the image sensor, and in addition at least one target parameter of the target object. The target direction as an azimuthal and/or elevational angle can be obtained directly from the direction information of the first sensor if the image sensor and first sensor are arranged close together or, in the case of greater distance between the image sensor and first sensor, can be derived from a target position detected by the sensor device and the position of the image sensor. A first target parameter can be, for example, the target distance and/or a movement variable of the target object, such as, e.g., speed and/or direction of movement. The direction of movement can be detected for example by trace-forming. The speed can be determined depending on the amount and direction of movement from a Doppler signal of an active sensor or likewise by trace-forming. Another target parameter can be the distance of the target object from the image sensor.

An aspect angle of the image sensor to the target object can be determined as a further derived first target parameter, which can be evaluated in a manner to be explained in greater detail for an estimate of the usable information content of an image to be recorded by the image sensor.

The emission of radio or radar waves or laser radiation by a target object can be determined as a target parameter in particular by a passive sensor of the sensor device, wherein optionally in addition a certain signature, e.g., as modulation, of an emission of this type can be established by a signature recognition device and can form a rear target parameter.

The target parameters determined by one or more first sensors of the sensor device are referred to as first target parameters. There can be several first target parameters for a target object.

Of the target objects detected in the sensor device, not necessarily all of the target objects are already fed with the first detection to a further detection by the image sensor. It can also be provided that firstly a signal processing, for example, with trace-forming, is carried out in the sensor device itself and/or detected target objects are ruled out from the further image sensor processing from the start, for example, target objects unequivocally recognized as friend target objects.

The target objects provided for further detection by the image sensor are respectively stored with direction information giving a solid angle regarding the image sensor and with target parameters available for the respective target object and subjected to further processing in an evaluation device. In the evaluation device evaluation criteria are stored, to which the target direction as well as individual target parameters as well as combinations or derived values from these values can be subjected.

The criteria can represent absolute criteria, which if they are not met results in a target object being excluded from further processing. An absolute criterion of this type can be, for example, the distance of the target object from the image sensor, wherein from a maximum distance preset as a threshold value, targets that are further distant from the image sensor are excluded from further processing, because if the distance is too great, the target resolution in the image recorded by the image sensor is too low to be able to obtain reliable information about the target object in an image evaluation. Another absolute criterion can be given, for example, for a spatial direction angle range when an obstacle lies in the line of sight of the image sensor in this solid angle range, for example, ship superstructures of a ship carrying the image sensor in maritime use. A target object, the spatial direction of which falls in this type of shaded angle range, cannot be detected by the image sensor, so that a further evaluation and an alignment of the image sensor to a target object of this type is not feasible either. Furthermore, for example, area ranges or spatial ranges can be predefined inside the monitoring area of the image sensor in which definitively no critical target is to be expected and in which detected targets are classified from the start as non-critical and are not further processed.

Target objects which are not excluded at an early stage by such absolute criteria are subjected to an evaluation in the evaluation device, wherein respectively one value designated as the prioritization value, in particular a numerical value on a one-dimensional scale, is determined for target objects and assigned to the target object. Typically, several target parameters including the spatial direction information can be used for the determination of the prioritization value and subjected individually or in combination to predetermined evaluation criteria.

Advantageously, at least one evaluation criterion is provided which provides a binary value as an output value. This can be carried out in particular by comparison of a target parameter to a threshold value or a value range as criterion, wherein the binary value output with this criterion, for example, is given the value zero (or incorrect) when a predetermined criterion, for example, exceeding a threshold value by a target parameter or the location of a target parameter within a range is not met and otherwise is given the value one (or correct).

Also at least one criterion can be provided which as an output value provides a multi-digit binary value, in that, for example, a scale for a target parameter is subdivided into four ranges, and binary value combinations of two binary digits are assigned to the four ranges.

The binary values thus obtained from evaluation criteria in this manner can be combined in a particularly advantageous embodiment to form a multi-digit binary index value, the individual binary digits of which are assigned unequivocally to certain criteria. However, the position of the individual binary digits thereby has no significance for the extent to which the respective criterion influences a prioritization value to be determined. The multi-digit binary index value thus obtained can be used as an address value for addressing a table in which a prioritization value is stored for all possible bit combinations of the index value. In this manner a prioritization value can be obtained via the index value, which is also referred to below as a table index, which prioritization value is also referred to below as a table prioritization value.

In another advantageous embodiment it can be provided that a prioritization value is obtained through weighted combination of values of target parameters or combinations of target parameters or values derived therefrom. A prioritization value obtained in this manner is also referred to below as a weighted prioritization value.

To obtain a weighted prioritization value, in particular target parameters can be used which can adopt a plurality of different values on a one-dimensional scale and thereby in preferably monotonic correlation influence the quality of a digital evaluation of an image recorded by the sensor. The values for the target parameters can thereby be given on a few discrete values according to a scale subdivision into a few ranges.

For example, in an advantageous embodiment the optical quality in the direction of a target object can be subdivided into several quality steps, to which a discrete numerical value is assigned in each case, wherein with monotonic sequence a better visibility leads to a higher prioritization value than a poorer visibility. The target distance can likewise as a target parameter be subject to this type of evaluation criterion, in that a small target distance indicates more reliable information from the automatic image evaluation than a greater target distance, and therefore a smaller target distance leads to a higher prioritization value than a large distance. In particular in the case of ships as maritime target objects, the aspect angle as the angle between the line of sight and the longitudinal direction of the ship plays an important role for the automatic evaluability of an image recorded by the image sensor, wherein a higher reliability of a target classification can be achieved with an aspect angle of 90° than with an aspect angle of 0° or 180°. As a further example of a weighted criterion in obtaining a weighted prioritization value in a recurring target object, the time between the current occurrence and the last classification of this target object in the automatic image evaluation can be used, wherein a longer time interval leads to a higher overall prioritization value than a short time interval. Finally, as a further example, the time used for a realignment of the image sensor to a target object compared to a previous alignment can also be used, wherein an angle difference in azimuth and/or elevation can be used as a gauge. Since this type of realignment due to motor-driven panning of the image sensor can easily take several seconds, it may be more favorable to prefer a target with an otherwise lower prioritization value but lower differential angle to a target object with an otherwise higher prioritization value but larger differential angle.

In obtaining the weighted prioritization value, it can also be provided that with one or more criteria or target parameters, the amount of the partial contribution to the total weighted prioritization value increases monotonically with decreasing reliability of the image evaluation, such a contribution to the overall prioritization value then being included as reducing the prioritization value, for example by a minus sign with a summation or as a denominator or part of a denominator in a ratio formation.

In general, the sensor assignment can be interpreted as an optimization problem in which the yield of information to be expected is maximized over all targets. The yield of information to be expected with a single target is a function of the ability of the sensor in an assignment to recognize the target, to carry out an assignment to the input and the threat to be expected from the target which is described by the weighted prioritization values by way of example.

In a particularly advantageous simple embodiment, a combination of a table prioritization value and a weighted prioritization value can be used to obtain a prioritization value. The stored target objects, to which new ones can be added constantly, are divided into a ranking based on the prioritization values assigned thereto, wherein without loss of generality it is assumed below that a higher prioritization value indicates a better ranking, i.e., a higher priority in the ranking of the successive processing of the target objects by the image sensor.

A control device controls the alignment of the image sensor to the respective target objects in that the target objects are processed in the order of the ranking generated from the prioritization values. A target object detected in this manner by the image sensor is subsequently deleted from the list, but upon renewed detection can again be specified as a target to be processed by the image sensor and again evaluated in the evaluation device.

A digital image generated by the image sensor for a target object is subjected to an automatic digital image evaluation. One or more further target parameters can be extracted from the automatic image evaluation. In particular, a further target parameter of this type can represent one of several predefined target classes. Another further target parameter can form information on visibility conditions in a particular spatial direction, for example.

In an advantageous further development, the further target parameters obtained in the automatic image evaluation in addition to the first target parameters determined in the sensor device can be assigned to the respective target objects and stored, if these target objects are to be subjected several times in chronological succession to an evaluation and an image evaluation. Direction-dependent target parameters obtained from the image evaluation, such as in particular, visibility conditions, glare conditions due to the position of the sun etc., can also be taken into account for other targets in the same or adjacent spatial directions in the evaluation as criteria.

In an advantageous further development it can be provided that the information obtained from the image evaluation, in particular the further target parameters extracted thereby, can be used to adaptively track individual criteria in the evaluation device and to hereby further improve the quality of the additional information from the image evaluation for the overall evaluation of the situation. The contribution to be expected from an individual target object to the total yield of information through sensor observations can hereby be acquired, as it were, and the function of the ability of the sensor to recognize the target in an assignment can thus be approximated.

In embodiments, the invention is directed to a method for detecting target objects by a first sensor device containing at least one first sensor and a second sensor device containing at least one second sensor, wherein the second sensor can be aligned by a control device in different spatial directions, with the following process steps: a) target objects are detected by the first sensor device; b) for the target objects respectively at least one first target parameter is determined; c) at least a part of the target objects is stored with the at least one first target parameter and information on the spatial direction of the target object relative to the position of the second sensor; d) the stored target objects are assessed based on target parameters and assessment criteria stored thereon and a highest priority target object is determined thereby; e) the second sensor is aligned to the highest priority target object determined in step d) and a sensor signal of the second sensor to the target object is obtained; f) by automatic evaluation of the sensor signal obtained on a target object in the second sensor at least one further target parameter is extracted; and g) the steps d) through f) are carried out repeatedly, optionally with the addition of newly added target objects according to a) through c).

In further embodiments, the at least one further target parameter is used to classify the target object in one of several classes of a classification.

In additional embodiments, the direction of movement of the target object relative to the image sensor and/or the speed of the target and/or the distance of the target is determined as a first target parameter.

In embodiments, the emission of radar or laser radiation by the target object is determined as a first target parameter.

In further embodiments, a recognizable signature of a radar or laser radiation emitted by the target object is determined as a first target parameter.

In additional embodiments, the target position of a target object is determined as a first target parameter.

In embodiments, at least one angle range of the alignment of the second sensor is predefined and reviewed as an assessment criterion, whether the target direction falls in this angle range.

In further embodiments, at least one partial area within the detection zone of the second sensor is predefined and reviewed as an assessment criterion, whether the target position lies in this partial area.

In additional embodiments, the time expenditure for the realignment of the second sensor to a target object is determined and taken into account in the assessment as a criterion.

In embodiments, a further target parameter extracted from the evaluation of the sensor signal of the second sensor to a target object is taken into account in the assessment as a criterion.

In further embodiments, at least one assessment criterion is adaptively changed taking into consideration the image evaluation.

In additional embodiments, respectively one prioritization value is generated in the application of the stored assessment criteria to the several target objects and the target object with the highest prioritization value is selected as the highest priority target object.

In embodiments, at least in one of the assessment criteria a first target parameter is compared to a threshold value and a binary value is generated.

In further embodiments, a multi-digit binary value is generated in at least one of the assessment criteria.

In additional embodiments, several binary values generated according to different assessment criteria are combined to form a table index and that with this table index as address, a prioritization table value is read out of a table.

In embodiments, a weighted prioritization value is determined by summation of weighted target parameters.

In further embodiments, a prioritization value is determined by the combination of a prioritization table value and a weighted prioritization value.

In additional embodiments, at least one absolute assessment criterion is applied to a first target parameter, with the non-satisfaction of which the target object is excluded from the current further processing.

In embodiments, an imaging electro-optical image sensor is used as a second sensor.

In further embodiments, a sensor that can be mechanically pivoted about at least one pivot axis is used as a second sensor.

In embodiments, the invention is directed to a system for detecting target objects, with a first sensor device containing at least one first sensor and a second sensor device with at least one second sensor, which can be aligned by a control device in different spatial directions, wherein: the first sensor device detects target objects and determines for them respectively a spatial direction regarding the position of the second sensor and at least one of several first target parameters; an assessment device determines a highest priority target object among several target objects on the basis of target parameters and stored assessment criteria; the control device aligns the second sensor to the highest priority target object previously determined; and an evaluation device extracts at least one further target parameter from the sensor signal of the second sensor In further embodiments, the second sensor is arranged on a vehicle.

In additional embodiments, at least one first sensor of the first sensor device is arranged at a fixed spatial assignment to the second sensor.

In embodiments, at least one sensor of the sensor device is an active radar or laser sensor In further embodiments, at least one sensor of the sensor device is a passive radar or laser detector.

In additional embodiments, a signature recognition device is assigned to the passive sensor.

In embodiments, the assessment device contains a binarily addressable table with prioritization table values.

In further embodiments, at least one assessment criterion can be adaptively adjusted in the assessment device.

In additional embodiments, the second sensor can be changeably aligned in azimuth and/or elevation in a motor-driven manner regarding a sensor carrier.

In embodiments, the second sensor is an image sensor.

In further embodiments, the image sensor is designed for the visible or the infrared spectral range.

In additional embodiments, the focal length of an optical system of the image sensor is changeable.

BRIEF DESCRIPTION OF THE DRAWINGS

The invention is illustrated further below based on advantageous exemplary embodiments. They show:

FIG. 3 A target from different aspect angles; and

FIG. 4 A range subdivision.

DETAILED DESCRIPTION OF THE INVENTION

Figure 1:
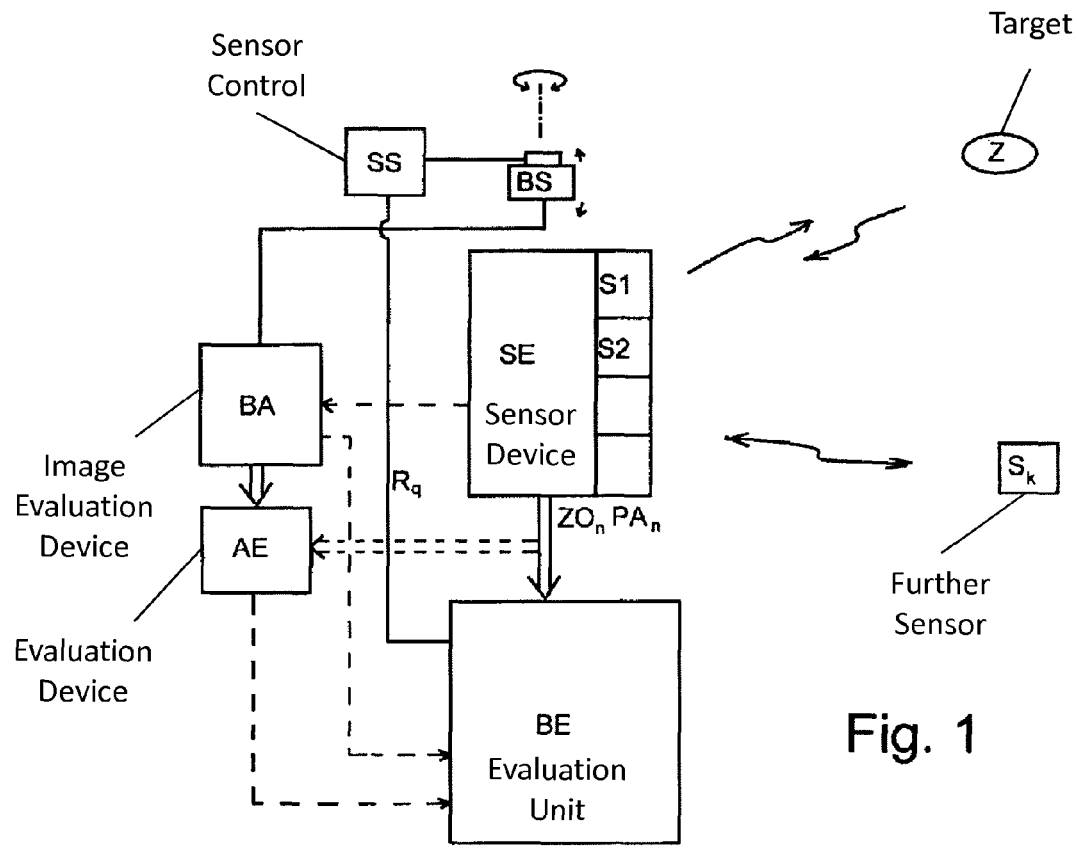
FIG. 1 A diagram of a detection system according to the invention.

FIG. 1 shows in a diagrammatic representation essential components of a system according to the invention.

A sensor device SE contains one or more sensors S1, S2, . . . , which are designed for detecting target objects in a detection zone. A target object is designated by Z in FIG. 1. The sensors S1, S2 can be active radar sensors, for example, or laser sensors or can also be formed by purely passive sensors, which detect only electromagnetic radiation that is actively emitted by the target Z. SK is used to designate a further sensor which can be arranged at a distance from the sensor device SE and connected via a data connection to the sensor device SE or the evaluation device.

The sensor device SE detects target objects in its detection zone and generates target reports thereon and determines first target parameters assigned to the respective target objects. Several target parameters can be determined hereby for one target object.

The sensor device SE transmits reports on target objects together with information on the spatial direction in which the target is located, and with the first target parameters determined, to an evaluation device BE. The transmitted spatial direction information and first target parameters $PA_n$ are individually assigned to the individual target objects $ZO_n$. Several first parameters can be assigned to each target object.

Figure 2:
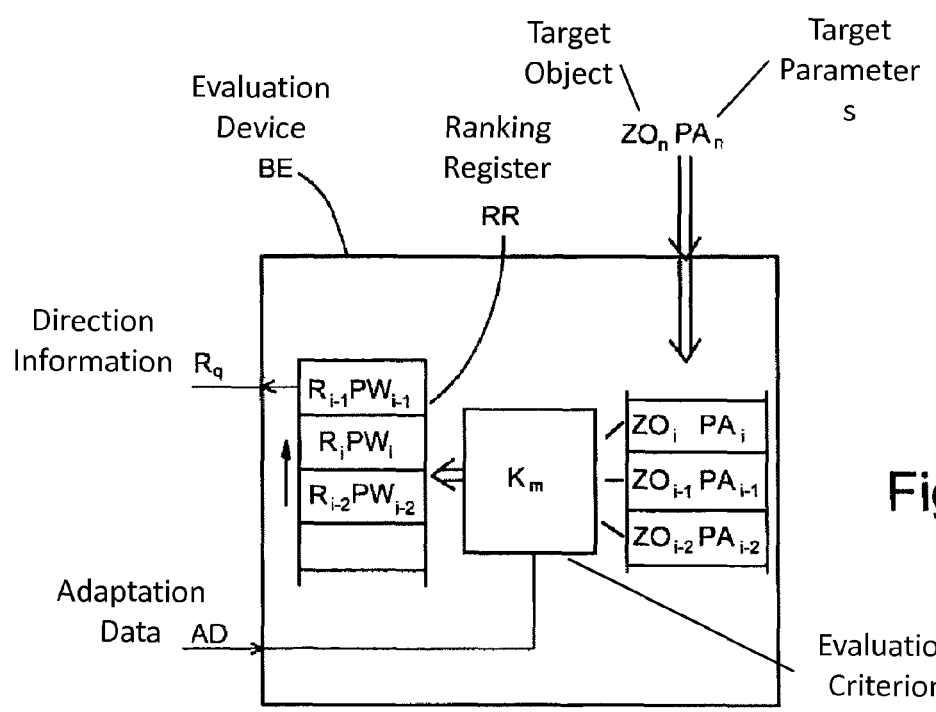
FIG. 2 A diagrammatic structure of an evaluation device.

The evaluation device BE, which is shown in more detail diagrammatically in FIG. 2, carries out an intermediate storage of the transmitted information while retaining the assignment to a certain target object and evaluates each target object $ZO_i$, $ZO_{i-1}$, $ZO_{i-2}$, . . . based on the target parameters $PA_i$, $PA_{i-1}$, $PA_{i-2}$, . . . stored therefor. The totality of the evaluation criteria is indicated overall by $K_m$ as an evaluation stage in the evaluation device.

The evaluation stage assigns a prioritization value $PW_n$ to each target object $ZO_n$, based on which in a ranking register RR target information on the individual target objects is stored in an order determined by the respective prioritization values $PW_n$, the first place of which being taken by the respectively highest priority target object. The ranking is not static and can change during the successive processing, in particular by newly detected target objects. Instead of the ranking, only one highest priority target object can also be respectively determined. The formation of a ranking has the advantage that only target objects to be newly evaluated have to be newly classified in the priority rank. The direction information $R_q$ of the respectively highest priority target object given to a sensor control SS, which aligns a second sensor mechanically and/or electronically alignable changing direction according to the direction information transmitted by the evaluation unit in the direction of this target object, i.e., assigns the second sensor to this target object. The target object hereby detected and evaluated by the second sensor can be evaluated anew and included in the ranking. In a preferred embodiment an electro-optical image sensor is assumed to be the second sensor below.

After the alignment of the image sensor in the desired spatial direction, the image sensor records a digital image and transmits it to an image evaluation device BA, which in a manner known per se extracts from the image information on a target object contained therein, for example, assigns such a target object with a certain probability to one of several target classes. The target class $ZK_n$ assigned to a target object $ZO_n$ in the image evaluation device BA in the image evaluation is fed to an evaluation device AE, which links the target class, if applicable, to further information, for example, the information transmitted by the sensor device SE.

In the image evaluation device BA, in addition to the assignment of a class, other target parameters $PZ_n$ can also be extracted and fed to the evaluation device BE, in order to take into account such a further target parameter as well with a new processing of the same target object.

In an advantageous further development it can be provided that the evaluation device AE evaluates the assigned target class and/or the overall situation so that the criteria stored in the evaluation unit BE can be modified to further improve the recognition of the overall situation. In FIG. 1 this is indicated by a path from the evaluation device AE to the assessment device BE and via this transmitted adaptation data AD.

The realignment of the image sensor including the recording of a digital image of the target typically takes several seconds. In successive processing of targets in the order of detection by the sensor device there would therefore be a danger that in this sense important targets that a quick reaction is necessary are reviewed too late by the image sensor. The assessment and assignment of a prioritization value and the processing in the order of the ranking of the prioritization values thus provides an automated and rapid processing with reproducible preference of targets with objectified importance for the overall situation.

An approach in the compilation of a prioritization value is described below in which two methods for generating a prioritization value are combined.

The following in particular can be reasons for an assignment (alignment) of the image sensor to a target object detected by the sensor device and the digital evaluation of a digital image of the target object recorded by the image sensor:

A detected target object has not previously been subjected to a detection by the image sensor and an automatic image evaluation, so that no further parameters extracted during the image evaluation are yet available;

A target object that has been reported via a communications device, but could not yet be identified or classified by the originator thereof, comes into the detection zone of the electro-optical sensor;

An already detected target object has been classified as (potentially) particularly threatening, because e.g., The target object is moving towards a protection object at high speed The target object has penetrated a special protection zone The target object emits an electromagnetic emission which is considered typical of an attack based on its characteristics, e.g., missiles (radar search head for missiles, fire-control radar of a combat aircraft, warship); and/or The target object is the source of a laser emission, e.g., a laser range finder, laser target designator or laser beam rider;

An already detected target object classified as non-threatening suddenly changes its behavior;

A new target has been detected by a different sensor and is likewise to be detected by this sensor in order to complete the position information based on the image evaluation; and/or For an action against a target object not hitherto classified, the type of measure against the target is to be quickly optimized with the aid of the automatic image evaluation.

A first method for an evaluation with generation of a prioritization value is to use each of the cited points as an evaluation criterion $K_m$, with the satisfaction of which, by a target object $ZO_n$ a partial value $TW_m$ stored for this criterion provides, as an addend, a contribution to a prioritization value PS formed by summation via the contributions by all M criteria $K_1$ through $K_M$. Unsatisfied criteria do not make a contribution. Satisfaction or non-satisfaction of a criterion Km can be displayed in the assessment device by a binary satisfaction value $E_m$ which can have, e.g., the values 0 (zero) or 1. The prioritization value PS then results as the sum.

$$PS = \sum_{m=1}^{M} (satisfactionvalue_m * TW_m)$$

It is shown that frequently different combinations of satisfied and non-satisfied criteria have special effects on the significance of a target objet for the evaluation of the situation, which cannot be adequately taken into consideration by such a simple generation of a prioritization value as the sum.

In an advantageous further development, therefore, every evaluation criterion is not used individually as an addend of a summation, but a multi-digit binary word is formed from the satisfaction values $TW_m$, wherein a fixed binary digit within the binary word is assigned to each criterion, in which the satisfaction value determined for this criterion is entered. A binary word of this type is then used as a key index for addressing a cell inside a table with stored prioritization values and the prioritization value stored in the addressed table cell is read out and assigned to the respective target object. The multi-digit binary word can (with m as the number of the respective criterion) also be expressed as a binary numerical value in the form $$Index = \sum_{m=1}^{M} (satisfactionvalue_m * 2^m)$$

However, the index does not have the function of a value further evaluated as a numerical value, but forms only a table address.

The prioritization value stored at the respectively associated table address forms an individual value for an individual combination of satisfied and non-satisfied criteria. With M criteria then $2^M$ individual prioritization values are stored as numerical values suitable for forming a ranking, of which some can be of the same size. Any interactions between individual criteria can hereby be advantageously taken into consideration in the stored priority values. There is also the possibility of assigning more than one binary digit to a criterion which cannot be usefully represented by a binary satisfaction value, so that a criterion as, e.g., a two-digit binary combination, can also assume four different values and this can be taken into consideration in the generation of the prioritization value.

Also with the first referenced embodiment, with the summation of partial values weighted with a satisfaction value over all criteria instead of a two-value satisfaction value 0/1, a greater differentiation of the satisfaction value can also be provided with more than two values.

It can also be provided for a part of the assessment criteria to carry out a weighted summation to obtain a first prioritization value and for another part of the assessment criteria to determine a second prioritization value from the table addressing with a multi-digit binary word and to link the two prioritization values, for example, to total them.

In particular with target parameters and criteria in which a greater value implies a lower prioritization value, it can be informative to consider contributions by such criteria as parts of a cost metric that has a negative effect in the generation of the prioritization value.

A cost metric of this type as a partial variable of a prioritization value can, for example, take into account the time taken for the realignment of the image sensor and possibly also the time for the image to be recorded by the sensor. The larger the panning angle for a realignment of the image sensor, the higher the contribution by the criterion of the alignment effort to a cost metric of this type, which in turn reduces the prioritization value, so that a target object otherwise of equal value with lower alignment effort is preferred. The contribution of this criterion reducing the prioritization value is expediently a function increasing monotonically with the alignment effort, for example, expressed as an amount of the panning angle necessary. A cost metric for the realignment of the image sensor to a target object can be expressed, for example, as a time effort cost metric $$L_{time\ expenditure} = f(T_{align} + T_{measurement})$$

in the total cost metric.

In the possible repetition of a measurement, that is, when a target object has already been measured once with this image sensor, another cost metric can result from the time difference to the last measurement, wherein a repeated measurement after a greater time interval compared to a repeated measurement after a shorter time interval is typically to be preferred. The contribution by this criterion then expediently forms a function monotonically decreasing with the time interval, e.g., a function decreasing in a linear or exponential manner between a maximum value and zero, and can be expressed as a repetition cost metric as a function of the time interval to the last measurement.

$$L_{repetition} = f(\text{time interval})$$

Further examples of criteria forming a cost metric can be parameters and factors which are of decisive importance for the quality of the image detection of the target object and the target object classification in the digital image evaluation, and thus, for the probability of success of an image detection and image evaluation, such as, in particular:

Distance of the image sensor from the target object;

Light conditions; low brightness;

Angular distance of the spatial direction of the target object from the current position of the sun;

Visibility conditions (such as, e.g., rain, fog); and/or

Movement of the target (speed, acceleration).

The above list is not to be considered complete or mandatory. Depending on the image sensor used, the list of criteria to be expediently used can vary.

Each of these criteria is weighted per se as an individual value and is included in the total cost metric as an individual cost metric, wherein the values are favorably restricted to a few discrete values.

Advantageous embodiments for discretization can be comparisons to predetermined threshold values (e.g., for the output of a brightness sensor or fog sensor used for support), wherein the several threshold values delimit value ranges adjoining one another. Exceeding one of the limit values generates the assigned discrete value.

The evaluation of all chances of success is taken into account with a cost metric for a possible failure. This cost metric can be advantageously realized by way of example by the following calculation:

$$L_{failure} = \sum_{m=1}^{M} (weighting_m * discretizationvalue_m)$$

where the following applies:
the $weighting_m$ designates the individual cost metric of a criterion "m," the discretization $value_m$ designates a discrete value (with value range $N_0 = \{0, 1, 2, 3 \ldots\}$), which increases, the more disadvantageously this criterion "m" is satisfied.

Example of discretization values of fog based on an arbitrary optical sensor:
  0: clear visibility;
  1: slight limitation;
  2: light fog;
  3: average fog;
  4: poor visibility; and or
  5: no visibility (sensor cannot be used).

Aspect Angle of the Target

It can be included as a further cost metric that, despite a successful assignment, the image information obtained thereby due to the unfavorable position of the target possibly renders a further automatic classification difficult or not useful at all.

By way of example, the aspect angle at which a target object is detected is cited.

If, for example, a ship is detected frontally from the front, this image of the ship is similar to many other types of ship, so that a precise classification is not possible.

However, if the target changes its position (aspect angle) relative to the line of sight between the image sensor and the ship so that the superstructures of the ship can be recognized spatially separated from one another, a more precise classification can also be carried out in an automated manner FIG. 3 shows a situation with an aspect angle of 0° (FIG. 3 A) and a situation with an aspect angle of 90° (FIG. 3 B), from which the influence of the aspect angle on the classification of this type of ship target MZ on an ocean surface MO is obvious.

The following definition is made to take into account the aspect angle:
  If a target moves radially away from the sensor, the aspect angle is zero;
  If the sight connection from the sensor to the target is perpendicular to starboard, the aspect angle is 90 degrees;
  If a target moves radially towards the sensor, the aspect angle is 180 degrees; and/or
  If the sight connection from the sensor to the target is perpendicular to port, the aspect angle is 270 degrees.

A cost metric can therefore be defined, that is larger, the more unfavorable the aspect angle $\alpha$.

One advantageous embodiment is a cost metric, that can be defined as follows:

$$LAspect = LAspectMax * |\cos \alpha|$$

where LAspectMax is the maximum cost value at the most unfavorable angle directly from the front or the rear (where the aspect angle is zero or 180 degrees),
$\cos \alpha$ is the angle function cosine for the aspect angle, and
|x| is the amount of a function or value.

The advantage of the calculation with the above-referenced formula is that for the aspect angle of 0 or 180 degrees the resulting cost metric yields the maximum, for the optimum aspect angle of 90 or 270 the function gives the value zero, that is, in this case no contribution to the total cost metric occurs.

The aspect angle, which is not usually exactly known, can be derived from the direction of the track based on the sensor position. For targets with lower to average maneuverability, this is sufficient. Otherwise, corresponding smoothing functions, such as an $\alpha$-$\beta$ filter, are favorable.

Based on all of the contributing factors that make an assignment appear unfavorable, a total cost metric is subsequently calculated:

$$L_{Total} = L_{Time\ Expenditure} + L_{Repetition} + L_{Failure} + L_{Aspect}$$

For each target that is not already ruled out for an assignment based on a pre-selection with absolute criteria, a prioritization value is determined in the evaluation device for which the cited variants are to be understood as examples for possible approaches without loss of generality. If from parts of the evaluation criteria different contributions to a prioritization value are determined separately as partial prioritization values, the partial prioritization values are finally linked to one another, wherein an additive or subtractive as well as a ratio formation or combinations thereof are possible. For example, a first prioritization value referred to as a use value can be determined from an evaluation criteria set, such as is cited by way of example in the description of the determination of a prioritization value, and with the total cost metric described by way of example as a further prioritization value the ratio $$V = \text{Use Value}/L_{Total}$$

can be determined and used as a prioritization value of the target object to be used for determining the ranking. The larger the ratio, the more suitable the target that is the next to be assigned to the sensor. Thus the target with the maximum is considered and allocated as the optimum pairing of sensor to target.

It is advantageous to already exclude those targets that in principle are not considered for an assignment of the sensor from further processing before the evaluation.

This includes in particular:
  Targets in a blind spot of the sensor, e.g., regions in which the sensor has no visibility due to e.g. structural measures or due to the location (for example, ship superstructures);
  Targets in a No-Pointing zone, e.g., predetermined regions which are to be excluded for reasons of operational stipulations;
  Targets that are located outside the typical visual range (range) of the sensor; and/or Targets that are no longer visible for optical reasons, that is, outside the so-called line of sight ("behind the optical horizon").

FIG. 4 shows in a simplified manner a plan view of a monitoring area of a system according to the invention, wherein EB designates a detection zone limited by a maximum distance for detection with the image sensor, BB designates a region that cannot be detected by the image sensor due to shading and NP designates a zone from which target reports are not processed further. The position of the image sensor is designated by SP.

The features given above and in the claims and discernible from the figures can be advantageously realized individually as well as in various combinations. The invention is not limited to the described exemplary embodiments, but can be modified within the scope of technical skill in different ways. In particular, in addition to the automated approach described, it can be provided that a measurement of a target object that can be initiated in a targeted manual manner is possible and can also have priority over the automatic handling.

The invention claimed is:

1. A method for detecting target objects by a first sensor device containing at least one first sensor and a second sensor device containing at least one second sensor, wherein the second sensor is alignable by a control device in different spatial directions, the method comprising:
   a) detecting target objects by the first sensor device;
   b) determining at least one first target parameter for the target objects, respectively;
   c) storing at least a part of the target objects with the at least one first target parameter and information on a spatial direction of the target object relative to a position of the second sensor;
   d) assessing the stored target objects based on target parameters and stored assessment criteria, and determining a highest priority target object thereby;
   e) aligning the second sensor to the highest priority target object determined in step d) and obtaining a sensor signal of the second sensor to the target object;
   f) extracting at least one further target parameter by automatic evaluation of the sensor signal obtained on a target object in the second sensor; and
   g) performing steps d) through f) repeatedly.

2. The method according to claim 1, wherein step g) further comprises adding newly added target objects according to steps a) through c).

3. The method according to claim 1, wherein the at least one further target parameter is used to classify the target object in one of several classes of a classification.

4. The method according to claim 1, wherein at least one of a direction of movement of the target object relative to the second sensor, a speed of the target and a distance of the target is determined as the at least one first target parameter.

5. The method according to claim 1, wherein one of an emission of radar and laser radiation by the target object is determined as the at least one first target parameter.

6. The method according to claim 1, wherein one of a recognizable signature of a radar and laser radiation emitted by the target object is determined as the at least one first target parameter.

7. The method according to claim 1, wherein a target position of the target object is determined as the at least one first target parameter.

8. The method according to claim 7, wherein at least one angle range of an alignment of the second sensor is predefined and reviewed as an assessment criterion, to determine whether a target direction falls in the at least one angle range.

9. The method according to claim 7, wherein at least one partial area within a detection zone of the second sensor is predefined and reviewed as an assessment criterion, to determine whether a target position lies in the at least one partial area.

10. The method according to claim 1, wherein a time expenditure for a realignment of the second sensor to a target object is determined and taken into account in the assessment as a criterion.

11. The method according to claim 1, wherein a further target parameter extracted from the evaluation of the sensor signal of the second sensor to the target object is taken into account in the assessment as a criterion.

12. The method according to claim 1, wherein at least one assessment criterion is adaptively changed taking into consideration an image evaluation.

13. The method according to claim 1, further comprising generating, respectively, one prioritization value in the assessing of the stored assessment criteria to the stored target objects and the target object with a highest prioritization value is selected as the highest priority target object.

14. The method according to claim 1, further comprising, at least in one of the assessment criteria, comparing a first target parameter to a threshold value, and generating a binary value.

15. The method according to claim 14, further comprising combining several binary values generated according to different assessment criteria to form a table index, and reading out a prioritization table value with the table index as address.

16. The method according to claim 15, further comprising determining a prioritization value by a combination of a prioritization table value and a weighted prioritization value.

17. The method according to claim 1, further comprising generating a multi-digit binary value in at least one of the assessment criteria.

18. The method according to claim 1, further comprising determining a weighted prioritization value by summation of weighted target parameters.

19. The method according to claim 1, further comprising applying at least one absolute assessment criterion to the at least one first target parameter, and excluding the target object from further processing with a non-satisfaction of the at least one absolute assessment criterion.

20. The method according to claim 1, wherein the second sensor comprises an imaging electro-optical image sensor.

21. The method according to claim 1, wherein the second sensor comprises a sensor that is mechanically pivotable about at least one pivot axis.

22. A system for detecting target objects according to the method of claim 1, the system comprising:
   the first sensor device structured and arranged to detect the target objects and determine for the target objects, respectively, a spatial direction regarding a position of the second sensor and the at least one first target parameter;
   an assessment device structured and arranged to determine the highest priority target object among the target objects on the basis of the target parameters and the stored assessment criteria;
   a control device structured and arranged to align the second sensor to the highest priority target object previously determined; and
   an evaluation device structured and arranged to extract at least one further target parameter from the sensor signal of the second sensor.

23. The system according to claim 22, wherein the second sensor is arranged on a vehicle.

24. The system according to claim 22, wherein the at least one first sensor of the first sensor device is arranged at a fixed spatial assignment to the second sensor.

25. The system according to claim 22, wherein the at least one first sensor of the first sensor device comprises an active radar or laser sensor.

26. The system according to claim 22, wherein the at least one first sensor of the first sensor device comprises a passive radar or laser detector.

27. The system according to claim 26, further comprising a signature recognition device assigned to the passive radar of the first sensor device.

28. The system according to claim 22, wherein the assessment device comprises a binarily addressable table with prioritization table values.

29. The system according to claim 22, wherein at least one assessment criterion of the stored assessment criteria is adaptively adjustable in the assessment device.

30. The system according to claim 22, wherein the second sensor is changeably alignable at least one of in azimuth and elevation in a motor-driven manner regarding a sensor carrier.

31. The system according to claim 22, wherein the second sensor comprises an image sensor.

32. The system according to claim 31, wherein the image sensor is configured for the visible or the infrared spectral range.

33. The system according to claim 32, wherein a focal length of an optical system of the image sensor is changeable.

34. A system for detecting target objects by a first sensor device containing at least one first sensor and a second sensor device containing at least one second sensor, wherein the second sensor is alignable by a control device in different spatial directions, the system comprising:
   the first sensor device structured and arranged to detect target objects and determine for the target objects, respectively, a spatial direction regarding a position of the second sensor and at least one first target parameter;
   an assessment device structured and arranged to determine a highest priority target object among the target objects on the basis of the at least one target parameter and stored assessment criteria;
   a control device structured and arranged to align the second sensor to the highest priority target object previously determined; and
   an evaluation device structured and arranged to extract at least one further target parameter from the sensor signal of the second sensor.

* * * * *